(12) United States Patent
Hidaka

(10) Patent No.: US 12,709,168 B2
(45) Date of Patent: Aug. 18, 2026

(54) BATTERY SUPPORTING STRUCTURE

(71) Applicant: HONDA MOTOR CO., LTD., Tokyo (JP)

(72) Inventor: Yuichi Hidaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 658 days.

(21) Appl. No.: 18/169,952

(22) Filed: Feb. 16, 2023

(65) Prior Publication Data

US 2023/0271511 A1 Aug. 31, 2023

(30) Foreign Application Priority Data

Feb. 28, 2022 (JP) ................................ 2022-029616

(51) Int. Cl.
*B60L 50/60* (2019.01)
*H01M 50/244* (2021.01)
*B63H 21/17* (2006.01)

(52) U.S. Cl.
CPC .......... *B60L 50/66* (2019.02); *H01M 50/244* (2021.01); *B60L 2200/32* (2013.01); *B63H 21/17* (2013.01); *H01M 2220/20* (2013.01)

(58) Field of Classification Search
CPC ...... B60L 50/66; B60L 2200/32; B60L 50/64; H01M 50/244; H01M 2220/20; H01M 50/296; H01M 50/249; Y02E 60/10; B63H 21/17; B63H 20/32; B63H 20/02; H02J 7/0045; H02J 7/50; H02J 7/933; B63J 2003/002
USPC .............................................. 114/343; 440/6
See application file for complete search history.

(56) References Cited

U.S. PATENT DOCUMENTS

| | | | | |
|---|---|---|---|---|
| 2014/0287283 | A1* | 9/2014 | Kimpara | H01M 50/202 429/53 |
| 2018/0155000 | A1 | 6/2018 | Sako | |
| 2019/0276127 | A1* | 9/2019 | Søvik | B63B 27/16 |
| 2021/0114695 | A1* | 4/2021 | Weisenburger | B63B 32/57 |

FOREIGN PATENT DOCUMENTS

| | | | | | |
|---|---|---|---|---|---|
| CN | 213150937 | U * | 5/2021 | | |
| JP | 2008080841 | A * | 4/2008 | | |
| JP | 2017137002 | A * | 8/2017 | | |
| JP | 2018-92815 | A | 6/2018 | | |
| KR | 10-2016-0121107 | A | 10/2016 | | |
| WO | WO-2017022394 | A1 * | 2/2017 | | B60L 53/80 |

OTHER PUBLICATIONS

CN-213150937-U Machine Translation (Year: 2021).*
JP-2008080841-A Machine Translation (Year: 2008).*
JP-2017137002-A Machine Translation (Year: 2017).*
WO-2017022394-A1 Machine Translation (Year: 2017).*
German Office Action dated Oct. 23, 2025 issued in corresponding German application No. 10 2023 103 492.8; English translation included (8 pages).

* cited by examiner

*Primary Examiner* — Lars A Olson
*Assistant Examiner* — Eric Anthony Starck
(74) *Attorney, Agent, or Firm* — Rankin, Hill & Clark LLP

(57) ABSTRACT

There is provided a battery supporting structure to be provided in a vessel, the battery supporting structure comprising a supporting part that supports a battery, wherein the supporting part is movable along a direction intersecting a deck of the vessel.

4 Claims, 3 Drawing Sheets

FR
UP
7
6
2
60
1
4
S
54
15
30
32
53
13
10
17
50
52
20
12
51
24
32
40
30
22
3
42
8

FR
UP
1
2
3
4
6
7
8
10
12
13
15
17
20
22
24
30
32
40
42
52
53
54
60
S

BATTERY SUPPORTING STRUCTURE

INCORPORATION BY REFERENCE

The present application claims priority under 35 U.S.C. § 119 to Japanese Patent Application No. 2022-029616 filed on Feb. 28, 2022. The content of the application is incorporated herein by reference in its entirety.

BACKGROUND OF THE INVENTION

Field of the Invention

The present invention relates to a battery supporting structure.

Description of the Related Art

There has conventionally been a vessel including a propulsion engine driven by electric power supplied from fuel cells, secondary cells such as a battery, or the like. In such a vessel, a battery is contained in a space inside a hull positioned below a deck (for example, see Japanese Patent Laid-Open No. 2018-92815).

SUMMARY OF THE INVENTION

There has however been a concern of low work efficiency since such a conventional configuration entails an operation that a user on the deck elevates the battery up to on the deck or lowers the battery below the deck in attaching/detaching the battery.

The present invention provides a battery supporting structure capable of improving work efficiency regarding attaching and detaching a battery.

An aspect of the present invention is a battery supporting structure to be provided in a vessel, the battery supporting structure comprising a battery supporting part that supports a battery, wherein the battery supporting part is movable along a direction intersecting a deck of the vessel.

According to an aspect of the present invention, it is possible to improve work efficiency regarding attaching and detaching a battery.

DETAILED DESCRIPTION OF THE PREFERRED EMBODIMENT

Hereafter, an embodiment of the present invention will be described with reference to the drawings.

Figure 1:
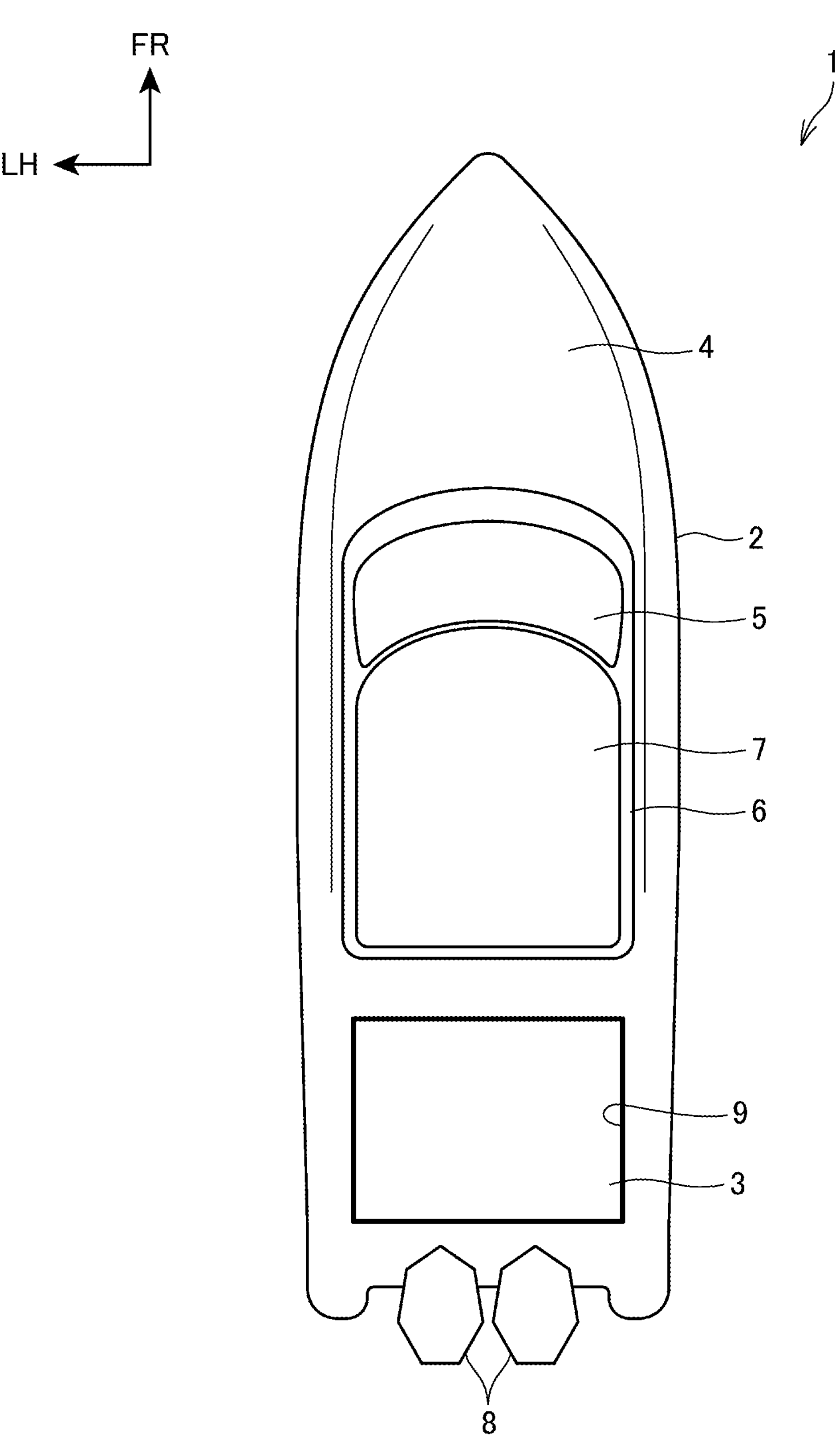
FIG. 1 is a plan view of a vessel 1 according to a present embodiment.

FIG. 1 is a plan view of a vessel 1. In FIG. 1, sign FR denotes a front side of the vessel 1 in the state of being capable of navigating on the water, and sign UP denotes an upper side of the vessel 1, and sign LH denotes a left side of the vessel 1. In the description below, directions are along these directions of the vessel 1, unless otherwise noted.

As shown in FIG. 1, the vessel 1 includes a hull 2 and a deck 4 forming an upper surface of the hull 2. Accordingly, the deck 4 covers an internal space S of the hull 2.

A cabin 6 is provided at substantially the center of vessel 1 in the front-rear direction in plan view of the hull 2. The cabin 6 is a substantially box-shaped structure that is formed to protrude upward from the deck 4 to a predetermined height. A cockpit 5 is provided ahead of the cabin 6. Namely, a front portion of the cabin 6 functions as a so-called bridge. The cabin 6 includes a ceiling 7 forming a ceiling surface of the cabin 6. The ceiling 7 is positioned above the deck 4.

There are provided in a rear portion of the hull 2 outboard engines 8 that function as a propulsion engine of the vessel 1. In the present embodiment, the vessel 1 has a pair of outboard engines 8 at the rear end of the hull 2. The outboard engines 8 are so-called electric outboard motors, which are driven by electric power.

On the deck 4, an opening 9 is provided between the rear end of the hull 2 and the rear end of the cabin 6. The opening 9 is an opening that allows communication between the internal space S and a portion above the deck 4. In the present embodiment, the opening 9 is provided to be rectangular in plan view.

The entire opening 9 is closed by a flat plate-shaped panel 3. When the opening 9 is closed, the panel 3 becomes flush with the upper surface of the deck 4. One side of the panel 3 that is positioned on the rear end portion of the vessel 1 is joined to the deck 4, for example, via a hinge or the like. Thereby, the panel 3 functions as a door member that can be opened and closed by swinging up and down on the upper side of the deck 4.

Figure 2:
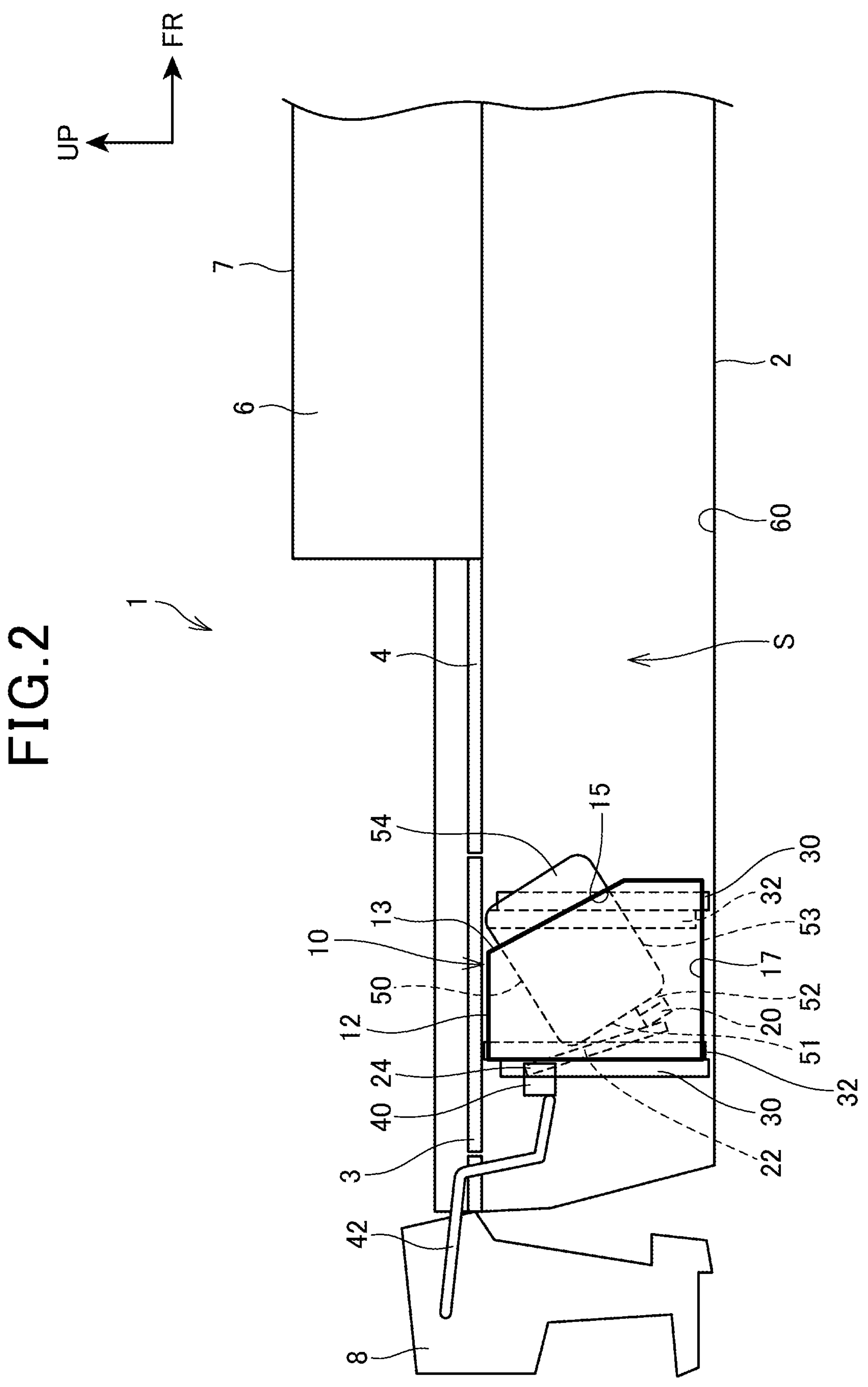
FIG. 2 is a view showing a battery supporting structure, showing a case where a supporting body is positioned below a deck.

FIG. 2 is a view showing a battery supporting structure 10, showing a case where the supporting body 12 is positioned below the deck 4. FIG. 2 is a view as the vessel 1 is viewed from the right.

As shown in FIG. 2, the battery supporting structure 10 is provided in the vessel 1. The battery supporting structure 10 is a structure that supports and fixes, to the vessel 1, a battery 50 that supplies electric power for driving the outboard engines 8.

The battery supporting structure 10 includes a supporting body 12. The supporting body 12 is a member that supports the battery 50. In the present embodiment, the supporting body 12 is box-shaped and has an inclined surface 13 formed at a predetermined place. The supporting body 12 corresponds to a "supporting part" of the present disclosure. The inclined surface 13 has a supporting opening 15 which is rectangular.

There is provided inside the supporting body 12 a supporting body terminal 20 as a terminal. The supporting body terminal 20 is provided at a position close to a bottom surface 17 of the supporting body 12 and is arranged so as to face the supporting opening 15. Namely, the supporting body terminal 20 is provided so as to be oriented obliquely upward.

Thereby, even when sea water or the like enters the inside of the supporting body 12, the supporting body terminal 20 is protected from being immersed in the sea water. Therefore, in the vessel 1, problems regarding power supply by the battery 50, such as short circuit, can be prevented.

To the supporting body terminal 20, one end of a bus bar 22 is connected. The bus bar 22 is a linear conductive member. The other end of the bus bar 22 protrudes to the outside of the supporting body 12. The other end of the bus bar 22 has a joining terminal 24 as a terminal.

Notably, while the supporting body 12 herein includes the bus bar 22, not limitedly, it may include another conductive member such as a wire.

The supporting body 12 is supported by supporting rails 30 via sliders 32. Each supporting rail 30 is a rail-shaped member that is arranged so as to extend along the up-down direction of the hull 2 in the internal space S below the deck 4. In other words, the supporting rails 30 extend so as to intersect the plane of the deck 4. In the present embodiment, in the internal space S, a pair of supporting rails 30 are arranged at a predetermined interval along the front-rear direction of the vessel 1. Each supporting rail 30 is arranged at a position overlapping with the opening 9 in plan view of the vessel 1. The upper end of each supporting rail 30 is positioned below the opening 9.

The sliders 32 are attached to the respective supporting rails 30 on a one-by-one basis. Each slider 32 is a member slidable along the longitudinal direction of the corresponding supporting rail 30, that is, the up-down direction of the vessel 1.

As mentioned above, the sliders 32 are joined to the supporting body 12. In the present embodiment, the sliders 32 are joined to respective ones of predetermined side surfaces of the supporting body 12 arranged along the front-rear direction of the vessel 1. Each predetermined side surface is a flat surface standing upward from the bottom surface 17.

There is joined to the sliders 32 a movement mechanism which moves the sliders 32. The movement mechanism is a gear slide mechanism, a hydraulic mechanism, or the like, for example. The movement mechanism may be driven manually by manipulation of the user. Otherwise, for example, the movement mechanism may be driven by any of various motive power sources such as a motor.

A hull terminal 40 as a terminal is provided on the supporting rail 30 of the plurality of supporting rails 30 that is positioned on the rear end portion of the vessel 1. The hull terminal 40 is provided at a position closer to the deck 4 than to a bottom surface 60 of the hull 2 in the longitudinal direction of the supporting rail 30. Namely, the hull terminal 40 is arranged above the bottom surface 60.

Thereby, even when sea water or the like enters the internal space S via the opening 9, for example, the hull terminal 40 is protected from being immersed in the sea water. Therefore, in the vessel 1, problems regarding power supply by the battery 50, such as short circuit, can be prevented.

The hull terminal 40 corresponds to a "second terminal" of the present disclosure.

To the hull terminal 40, one end of a power supply line 42 is connected. The power supply line 42 is wiring that connects the hull terminal 40 to the outboard engines 8. The other end of the power supply line 42 is connected to the outboard engines 8.

As mentioned above, the opening 9, the supporting body 12, and the supporting rails 30 are arranged between the rear end of the hull 2 and the rear end of the cabin 6, that is, on the rear portion of the vessel 1 that is a position close to the outboard engines 8. Thereby, the power supply line 42 can be shortened, and it is possible to simplify wiring in the vessel 1.

Since the sliders 32 are joined to the supporting body 12 as mentioned above, the supporting body 12 is movable along the up-down direction of the vessel 1 in accordance with movement of the sliders 32. Likewise, in the battery supporting structure 10, the joining terminal 24 also moves upward and downward, in accordance with movement of the supporting body 12. The joining terminal 24 is provided at a position where it is connected to the hull terminal 40 when the supporting body 12 is positioned at lowermost parts of the supporting rails 30 within a movable range of the supporting body 12. In other words, the joining terminal 24 and the hull terminal 40 are separated from each other when the supporting body 12 is positioned above the lowermost parts of the supporting rails 30.

Accordingly, the battery supporting structure 10 prevents the battery 50 from discharging when the supporting body 12 has been moved upward, for example, for the purpose of replacement of the battery 50 or other purposes. Therefore, in the vessel 1, it is possible to prevent the battery 50 from discharging except when the outboard engines 8 are driven.

The battery 50 is a substantially rectangular solid-shaped power storage device. A battery terminal 52 as a terminal is provided on a bottom surface 51 in one end of the battery 50 in the longitudinal direction. In the present embodiment, the battery terminal 52 is provided at a position close to one side surface 53 standing upward from the bottom surface 51. The battery terminal 52 corresponds to a "first terminal" of the present disclosure.

Figure 3:
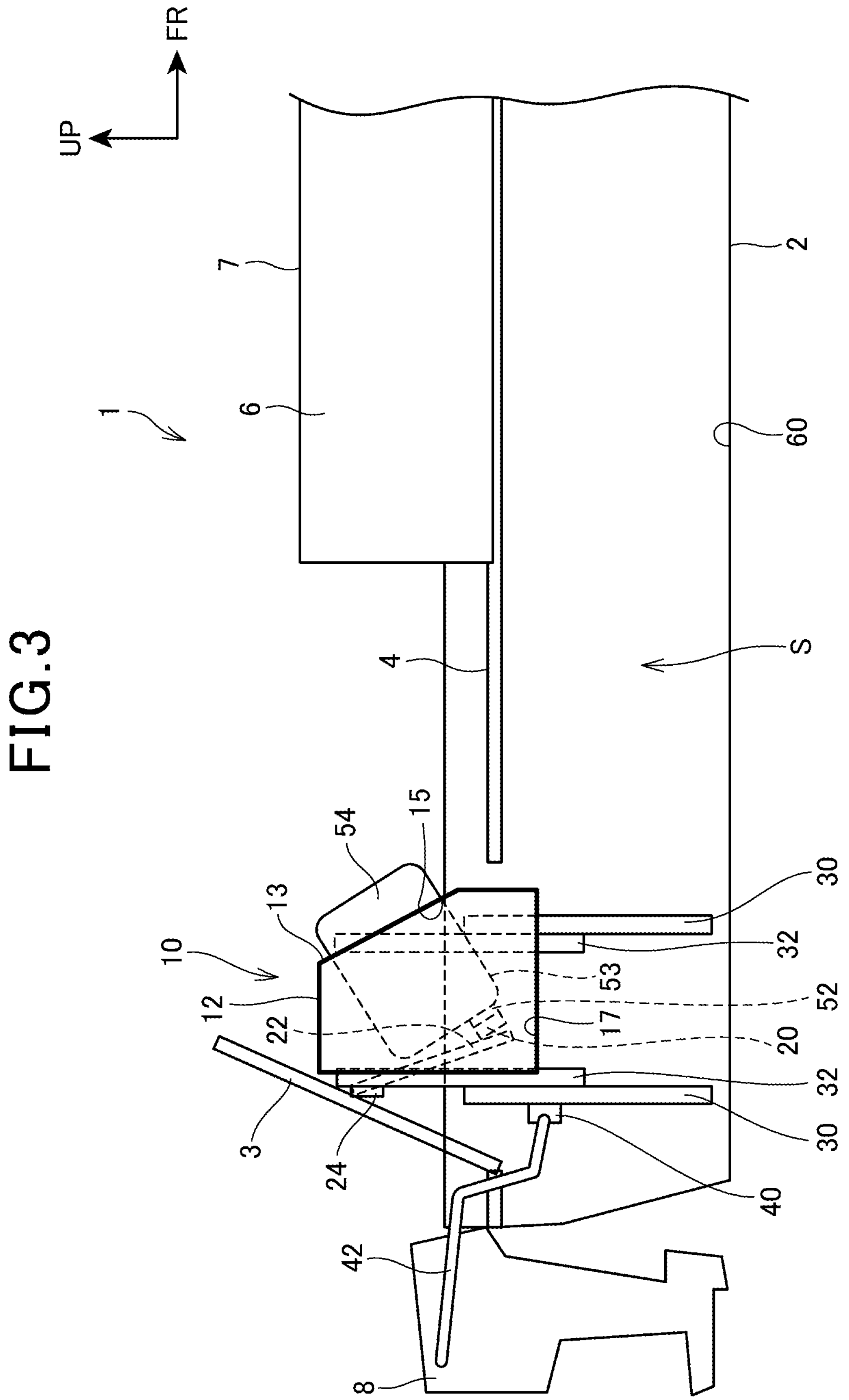
FIG. 3 is a view showing the battery supporting structure, showing a case where at least part of the supporting body is positioned above the deck.

FIG. 3 is a view showing the battery supporting structure 10, showing a case where at least part of the supporting body 12 is positioned above the deck 4. FIG. 3 is a view as the vessel 1 is viewed from the right.

As shown in FIG. 3, when the supporting body 12 is positioned at uppermost parts of the supporting rails 30 within a movable range of the supporting body, the panel 3 having been pushed up by the supporting body 12 pivots to uncover the opening 9, and at least part of the supporting body 12 is positioned above the deck 4. More in detail, the inclined surface 13 is entirely positioned above the deck 4. Meanwhile, the bottom surface 17 as the lower end of the supporting body 12 is positioned below the deck 4.

Accordingly, the movable range of the supporting body 12 is restricted, and the supporting body 12 is prevented from excessively moving upward of the deck 4. Therefore, it is possible to improve the user's work efficiency regarding attaching/detaching the battery 50 to/from the supporting body 12.

The panel 3 having pivoted when the supporting body 12 is positioned at the uppermost parts of the supporting rails 30 is arranged so as to stand obliquely from the rear end toward the front portion of the vessel 1 on the upper surface of the deck 4. Accordingly, even when there are sea water, driftage, and/or the like on the upper surface of the panel 3, they are forced to slide on the upper surface of the panel 3, which is inclined when pivoting, to be moved away from the opening 9. Therefore, even when the panel 3 pivots, sea water or the like is prevented from entering the internal space S through the opening 9.

The battery 50 is attached/detached to/from the supporting body 12 by the user in the state where the supporting body 12 is positioned at the uppermost parts of the supporting rails 30 within the movable range of the supporting body 12.

Accordingly, the user can attach/detach the battery 50 to/from the supporting body 12 just on the deck 4 without the need of carrying the battery 50 between above and below the deck 4. Therefore, in the vessel 1, it is possible to improve work efficiency regarding attaching and detaching the battery 50.

When causing the supporting body 12 to support the battery 50, the user inserts the battery 50 through the supporting opening 15 with its bottom surface 51 first. In this case, the user inserts the battery 50 through supporting opening 15 such that the one side surface 53 is along the lower edge of the supporting opening 15, that is, such that the battery terminal 52 is to be arranged at a position close to the bottom surface 17. When the battery 50 has been inserted to a predetermined position in the supporting body 12, the battery terminal 52 is connected to the supporting body terminal 20.

Notably, the supporting body 12 may have a so-called locking mechanism for fixing the battery 50 to the supporting body 12 when the battery terminal 52 is connected to the supporting body terminal 20.

When the battery 50 is supported by the supporting body 12, the other end 54 of the battery 50 protrudes upward obliquely from the supporting opening 15 toward the front portion of the vessel 1. Namely, the end 54 protrudes to the outside of the supporting body 12. The user can attach/detach the battery 50 to/from the supporting body 12 by gripping the end 54. Notably, handles or the like may be provided at the end 54.

As mentioned above, the supporting body 12 supports the battery 50 so as to protrude upward obliquely toward the front portion of the vessel 1. Accordingly, in the battery supporting structure 10, the battery 50 and the supporting opening 15 are arranged so as to face the user on the deck 4. Therefore, the battery supporting structure 10 can improve work efficiency regarding attaching and detaching the battery 50.

After the battery 50 is supported by the supporting body 12, the user drives the movement mechanism to move the supporting body 12 up to below the deck 4. When the supporting body 12 is positioned at the lowermost parts of the supporting rails 30 within the movable range of the supporting body 12, each of the supporting body 12 and the battery 50 is entirely positioned below the deck 4.

Accordingly, in the vessel 1, the supporting body 12 and the battery 50 can be contained below the deck 4 when the battery 50 supplies electric power. Therefore, in the vessel 1, a space above the deck 4 can be prevented from decreasing, and the center of gravity of the vessel 1 can be prevented from rising.

When the supporting body 12 moves to the lowermost parts of the supporting rails 30 within the movable range of the supporting body 12, the joining terminal 24 and the hull terminal 40 are connected with each other. Accordingly, in the vessel 1, electric power can be supplied to the outboard engines 8 from the battery 50.

As described above, according to the present embodiment, the battery supporting structure 10 provided in the vessel 1 includes the supporting body 12 which supports the battery 50, and the supporting body 12 is movable along a direction intersecting the deck 4 of the vessel 1.

Accordingly, in the vessel 1, the battery 50 can be moved between above and below the deck 4. Therefore, in the vessel 1, it is possible to improve work efficiency regarding attaching and detaching the battery 50.

Moreover, according to the present embodiment, the supporting body 12 is movable upward to a position where at least part of the battery 50 is positioned above the deck 4.

Accordingly, the user can attach/detach the battery 50 to/from the supporting body 12 just on the deck 4 without the need of carrying the battery 50 between above and below the deck 4. Therefore, in the vessel 1, it is possible to improve work efficiency regarding attaching and detaching the battery 50.

Moreover, according to the present embodiment, the supporting body 12 is movable downward to a position where the supporting body 12 is entirely positioned below the deck 4.

Accordingly, in the vessel 1, the supporting body 12 and the battery 50 can be contained below the deck 4 when the battery 50 supplies electric power. Therefore, in the vessel 1, a space above the deck 4 can be prevented from decreasing, and the center of gravity of the vessel 1 is prevented from rising.

Moreover, according to the present embodiment, the battery terminal 52 is provided at the battery 50, and the supporting body 12 supports the battery 50 in a direction in which the end 54 of the battery 50 is to intersect the deck 4, the end 54 being positioned on the opposite side to the battery terminal 52, the supporting body 12 supporting the battery 50 such that the end 54 is positioned above the battery terminal 52.

Accordingly, in the battery supporting structure 10, the battery 50 and the supporting opening 15 are arranged so as to face the user on the deck 4. Therefore, with the battery supporting structure 10, it is possible to improve work efficiency regarding attaching and detaching the battery 50.

Moreover, according to the present embodiment, the hull terminal 40 is provided in the vessel 1, and the battery terminal 52 and the hull terminal 40 are connected with each other when the supporting body 12 is positioned below the deck 4.

Accordingly, the battery supporting structure 10 prevents the battery 50 from discharging when the supporting body 12 has been moved upward, for example, for the purpose of replacement of the battery 50 or other purposes. Therefore, in the vessel 1, it is possible to prevent the battery 50 from discharging except when the outboard engines 8 are driven.

Moreover, according to the present embodiment, the hull terminal 40 is provided at a position closer to the deck 4 than to the bottom surface 60 of the hull 2 included in the vessel 1.

Accordingly, even when sea water or the like enters the internal space S, for example, via the opening 9, the hull terminal 40 is protected from being immersed in the sea water. Therefore, in the vessel 1, problems regarding power supply by the battery 50, such as short circuit, can be prevented.

The aforementioned embodiment is an example of an aspect of the present invention and any modifications and applications thereof may occur without departing from the spirit of the present invention.

While in the aforementioned embodiment, the supporting body 12 is a box-shaped member, not limitedly, it may be any member as long as it has a shape in which the battery 50 can be held, such, for example, as a pillar shape, a hook shape, or a frame shape.

The supporting body 12 may be formed to be capable of supporting a plurality of batteries 50. In this case, there may be connected to the hull terminal 40 all of the conductive members such as bus bars 22 and joining terminals 24 connected to the respective batteries 50. Namely, the hull terminal 40 may be a terminal that functions as a so-called centralized terminal. Accordingly, in the vessel 1, it is possible to simplify the wiring for the vessel 1 and the battery supporting structure 10.

While in the aforementioned embodiment, the battery 50 supplies electric power to the outboard engines 8, not limitedly, it may supply electric power to other electric fittings such as a winch and a sonar.

The directions such as horizontal one and vertical one and the various shapes in the aforementioned embodiment are intended to include their equivalents that attain the same effects as those directions and shapes do (so-called equivalent ranges), unless otherwise noted.

Configurations Supported by the Aforementioned Embodiment

The aforementioned embodiment supports the following configurations.

(Configuration 1) A battery supporting structure to be provided in a vessel, the battery supporting structure including a battery supporting part that supports a battery, wherein the battery supporting part is movable along a direction intersecting a deck of the vessel.

According to this configuration, in the vessel, the battery can be moved between above and below the deck. Therefore, in the vessel, it is possible to improve work efficiency regarding attaching and detaching the battery.

(Configuration 2) The battery supporting structure according to Configuration 1, wherein the battery supporting part is movable upward to a position where at least part of the battery is positioned above the deck.

According to this configuration, the user can attach/detach the battery to/from the supporting part just on the deck without the need of carrying the battery between above and below the deck. Therefore, in the vessel, it is possible to improve work efficiency regarding attaching and detaching the battery.

(Configuration 3) The battery supporting structure according to Configuration 1, wherein the battery supporting part is movable downward to a position where the battery supporting part is entirely positioned below the deck.

According to this configuration, in the vessel, the supporting part and the battery can be contained below the deck when the battery supplies electric power. Therefore, in the vessel, a space above the deck can be prevented from decreasing, and the center of gravity of the vessel can be prevented from rising.

(Configuration 4) The battery supporting structure according to any of Configuration 1 to Configuration 3, wherein a first terminal is provided at the battery, and the battery supporting part supports the battery in a direction in which an end of the battery is to intersect the deck, the end being positioned on an opposite side to the first terminal, the battery supporting part supporting the battery such that the end is positioned above the first terminal.

According to this configuration, in the battery supporting structure, the battery and the supporting opening 15 are arranged so as to face the user on the deck. Therefore, with the battery supporting structure, it is possible to improve work efficiency regarding attaching and detaching the battery.

(Configuration 5) The battery supporting structure according to Configuration 4, wherein a second terminal is provided in the vessel, and the first terminal and the second terminal are connected with each other when the battery supporting part is positioned below the deck.

According to this configuration, the battery supporting structure prevents the battery from discharging when the supporting part has been moved upward, for example, for the purpose of replacement of the battery or other purposes. Therefore, in the vessel, it is possible to prevent the battery from discharging except when the battery supplies electric power to a predetermined fitting.

(Configuration 6) The battery supporting structure according to Configuration 5, wherein the second terminal is provided at a position closer to the deck than to a bottom surface of a hull of the vessel.

According to this configuration, even when sea water or the like enters, for example, a lower portion below the deck, the second terminal is protected from being immersed in the sea water. Therefore, in the vessel, problems regarding power supply by the battery, such as short circuit, can be prevented.

REFERENCE SIGNS LIST

- 1 Vessel
- 2 Hull
- 3 Panel
- 4 Deck
- 10 Battery supporting structure
- 12 Supporting body (supporting part)
- 40 Hull terminal (second terminal)
- 50 Battery
- 52 Battery terminal (first terminal)
- 54 End
- 60 Bottom surface

What is claimed is:

1. A battery supporting structure to be provided in a vessel, the battery supporting structure comprising:

a supporting part that supports a battery, wherein the supporting part is movable along a first direction intersecting a deck of the vessel, a first terminal is provided on one end of the battery, the supporting part supports the battery so that a surface of an other end of the battery faces a second direction which intersects the deck and that the surface of the other end of the battery is positioned above the first terminal, the other end being positioned on an opposite side to the one end of the battery, a second terminal is provided in the vessel, the first terminal and the second terminal are connected with each other when the supporting part is positioned below the deck, and the second terminal is provided at a position closer to the deck than to a bottom surface of a hull of the vessel, the supporting part is a box and includes a supporting opening through which the battery is inserted, and when the supporting part is positioned at an uppermost portion within a movable range of the supporting part, the supporting opening is positioned above the deck.

2. The battery supporting structure according to claim 1, wherein the supporting part is movable upward to a position where at least part of the battery is positioned above the deck.

3. The battery supporting structure according to claim 1, wherein the supporting part is movable downward to a position where the supporting part is entirely positioned below the deck.

4. The battery supporting structure according to claim 1, wherein the battery is supported by the supporting part in a state in which the one end of the battery is inserted through the supporting opening into an interior of the supporting part and the other end of the battery protrudes upward from the supporting opening.

* * * * *